(12) United States Patent
Yura et al.

(10) Patent No.: US 9,136,737 B2
(45) Date of Patent: Sep. 15, 2015

(54) STATOR AND RESOLVER

(75) Inventors: Motozumi Yura, Aichi (JP); Yasunori Kawakami, Aichi (JP)

(73) Assignee: OKUMA Corporation, Niwa-gun, Aichi (JP)

( * ) Notice: Subject to any disclaimer, the term of this patent is extended or adjusted under 35 U.S.C. 154(b) by 426 days.

(21) Appl. No.: 13/462,369

(22) Filed: May 2, 2012

(65) Prior Publication Data

US 2012/0280678 A1 Nov. 8, 2012

(30) Foreign Application Priority Data

May 2, 2011 (JP) .................................. 2011-103168

(51) Int. Cl.
*H01F 5/00* (2006.01)
*H02K 3/28* (2006.01)
*H02K 24/00* (2006.01)

(52) U.S. Cl.
CPC . *H02K 3/28* (2013.01); *H02K 24/00* (2013.01)

(58) Field of Classification Search
None
See application file for complete search history.

(56) References Cited

U.S. PATENT DOCUMENTS

| | | | |
|---|---|---|---|
| 3,772,587 A * | 11/1973 | Farrand et al. | .................. 336/10 |
| 4,612,503 A | 9/1986 | Shimizu et al. | |
| 5,339,030 A | 8/1994 | Hayashi | |
| 5,382,900 A | 1/1995 | Hayashi | |
| 5,434,372 A * | 7/1995 | Lin | ............................. 178/18.07 |
| 5,708,344 A | 1/1998 | Hayashi et al. | |
| 6,534,970 B1 * | 3/2003 | Ely et al. | .................. 324/207.17 |
| 8,570,028 B2 * | 10/2013 | Ely | ............................ 324/207.15 |
| 2002/0005674 A1 | 1/2002 | Hayashi | |
| 2005/0104704 A1 | 5/2005 | Aoyama et al. | |

FOREIGN PATENT DOCUMENTS

| | | |
|---|---|---|
| GB | 2012431 A | 7/1979 |
| JP | S54-43765 A | 4/1979 |
| JP | S57-70406 | 4/1982 |
| JP | H04-5525 A | 1/1992 |
| JP | H05-87512 A | 4/1993 |
| JP | H09-28069 A | 1/1997 |
| JP | H11-37795 A | 2/1999 |
| JP | H11-234995 A | 8/1999 |
| JP | 2002-027719 A | 1/2002 |
| JP | 2003-207370 A | 7/2003 |

(Continued)

OTHER PUBLICATIONS espacenet, Patent Abstract for Japanese Publication No. 4199826 Published Dec. 24, 2008 (1 page).

(Continued)

*Primary Examiner* — Paresh Patel
(74) *Attorney, Agent, or Firm* — Osha Liang LLP (57) ABSTRACT

Coils are formed into a coil group for a single phase by serially connecting a plurality of coils so that the resulting magnetic flux distribution is a sine wave distribution. The coil group for a single phase is constituted by a plurality of coil sets, formed from two coils that are wound around two adjacent magnetic pole teeth, connected in series. Each coil set includes coils of the two magnetic pole teeth constituting that coil set wound in opposite directions to each other looking from the inside of the stator. An electrical wire extending from an end winding of each coil is turned back so as to run in a direction opposite to an electrical wire connection to a start winding of that coil, and is connected to either a start winding of the next coil or a connection terminal.

2 Claims, 4 Drawing Sheets

(56) References Cited

FOREIGN PATENT DOCUMENTS

| | | |
|---|---|---|
| JP | 2004-159462 A | 6/2004 |
| JP | 2006-125995 A | 5/2006 |
| JP | 2008-241405 A | 10/2008 |
| JP | 4199826 A | 12/2008 |
| JP | 2010-239692 A | 10/2010 |
| JP | 2011-064710 A | 3/2011 |

OTHER PUBLICATIONS

Office Action issued Mar. 10, 2015, in corresponding Japanese Patent Application No. 2011-103168 (with translation) (4 pgaes).

Office Action in corresponding Japanese Patent Application No. 2011-103168 mailed Aug. 12, 2014, with translation (11 pages).

* cited by examiner

STATOR AND RESOLVER

PRIORITY INFORMATION

This application claims priority to Japanese Patent Application No. 2011-103168, filed on May 2, 2011, which is incorporated herein by reference in its entirety.

BACKGROUND

1. Technical Field

The present invention relates to a stator provided with a stator core having a plurality of magnetic pole teeth arranged annularly, and a plurality of coils formed by respectively winding electrical wire around the plurality of magnetic pole teeth, and to a resolver provided with this stator and a rotor, for detecting a rotational position of a rotating shaft by detecting variations in reluctance between the rotor and the stator, and specifically relates to a stator and resolver that can negate inductive noise caused by an external field, that is passed to excitation coils to affect all detection coils wires, and that can increase angle detection accuracy.

2. Related Art

With a reluctance type resolver, there is a problem that magnetic flux and an external magnetic field generated from linked sections of the excitation coils interfere with linked sections of detection coils that are adjacent to the linked sections of the excitation coils, and cause the angle detection accuracy to be lowered. With respect to this type of problem, with a brushless type rotation detector a winding device that can suppress lowering of angle detection accuracy, formed by continuously winding coils of the same polarity in coil groups of a single phase in one direction so that a start winding and an end winding cross, and then, if winding of magnetic poles of the same polarity is completed, reversing the winding direction and winding remaining coils of an opposite polarity in the other direction so that the start winding and end winding cross, is disclosed as a detection winding device that can reduce interference by magnetic flux leaking from a rotating transformer on winding sections (refer to JP 4199826 B, for example). An embodiment of a coil device of related art disclosed in JP 4199826 B etc. will be described with reference to the drawings.

Figure 1:
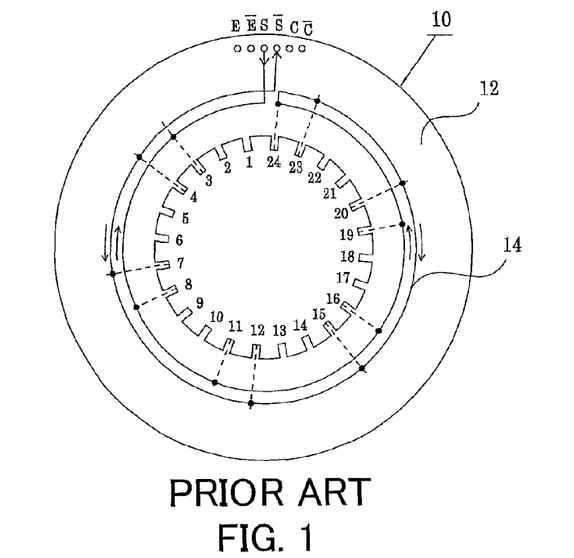
FIG. 1 is a drawing showing one example of an arrangement pattern of coil groups of the related art.

FIG. 1 shows a coil group 14 (SIN phase) that is wound around a stator 10 of a reluctance type resolver of the related art. A stator core 12 of the stator shown in FIG. 1 has 24 tooth sections provided on an internal bore, and each tooth section has an electrical wire wound around it to form a coil. The formed coils are connected in series to form a detection coil group 14. Also, each coil group 14 constitutes a phase with two teeth as a single set. Black dots shown in FIG. 1 represent locations of tooth sections where electrical wires are wound.

Figure 2:
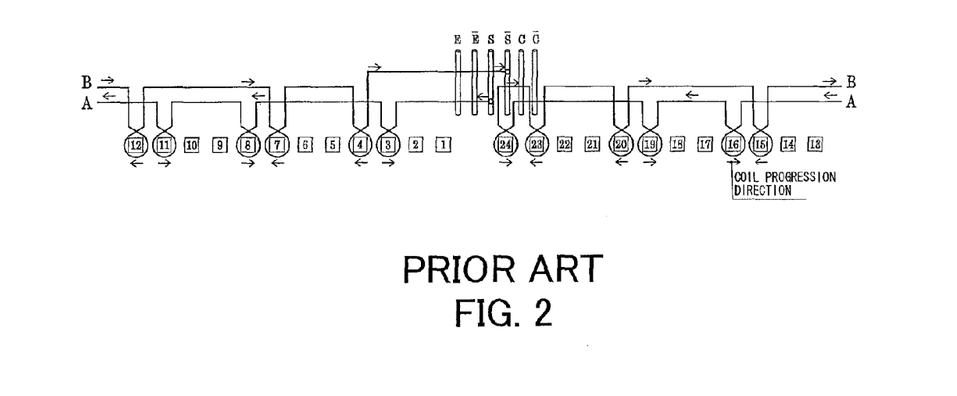
FIG. 2 is a development view schematically showing an arrangement pattern for the detection coil group shown in FIG. 1, looking from the internal bore of the stator.

FIG. 2 is a development view schematically showing an arrangement pattern for the detection coil group 14 (SIN phase) using the winding method shown in FIG. 1, looking from the internal bore of the stator core 12. A method of arranging the SIN phase coil group 14 will be described using FIG. 2.

A SIN phase is constituted by a group of tooth section Nos. (3, 4), (7, 8), (11, 12), (15, 16), (19, 20), and (23, 24). Also, the group of tooth section Nos. (3, 4), (11, 12) and (19, 20) and the group of tooth section Nos. (7, 8), (15, 16) and (23, 24) have a structure with phases offset by 180°. Accordingly, an electrical wire that has been sequentially wound around tooth section Nos. 3, 8, 11, 16, 19 and 24 from an output terminal S is turned back at tooth section No. 24, sequentially wound around tooth section No. 23, 20, 15, 12, 7 and 4, and con-nected to output terminal S̄. The same also applies to other alphabetic characters in the following). The direction of winding the coils (Winding direction of electrical wires on each tooth section. In FIG. 2 a direction shown by an arrow beneath each tooth section.) is the same as the connection direction between coils (In FIG. 2 the direction shown by arrows above the electrical wires connecting between coils). Specifically, in the case where the connection direction between coils is anticlockwise, the winding direction of the coils is also anticlockwise looking from the inside of the stator, and in the case where the connection direction between coils is clockwise, the winding direction of the coils is also clockwise looking from the inside of the stator.

With the arrangement pattern for detection coils as shown in FIG. 2, in a SIN phase, at tooth section No. 24 where the connection direction between coils is turned back, since an undesired gap arises in one turn, the number of windings in each coil section is different, and angle detection accuracy is lowered.

Figure 5A:
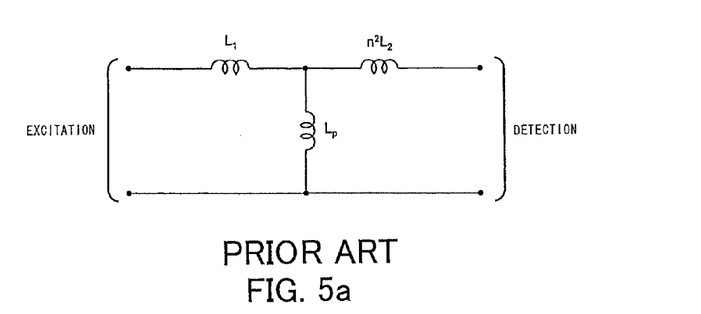
FIG. 5a is a drawing showing equivalent circuit of a conventional resolver.

Also, a schematic drawing of an equivalent circuit of a resolver looking from the primary side is shown in FIG. 5a. With a SIN phase single body, an electrical wire is sequentially wound around tooth section Nos. 3, 8, 11, 16, 19 and 24 from an output terminal S, is turned back at tooth section No. 24, sequentially wound around tooth section Nos. 23, 20, 15, 12, 7 and 4, and connected to output terminal S̄. As a result, electrical wires connecting between coils are reversed with respect to each other, and are adjacent, which means that it is possible to negate any influence due to an external magnetic field, and it is possible to increase angle detection accuracy. However, with this related art technology, as shown in FIG. 5a, it is not possible to negate inductive noise caused by an external magnetic field, that is passed to the excitation coils and influences all detection coils, and angle detection accuracy is lowered.

In fact, with the related art disclosed in JP 4199826 B, there is a problem in that at a tooth section where the connection direction between coils is turned back, since an undesired gap arises in one turn, the number of windings in each coil section is different, and angle detection accuracy is lowered. Also, with the technology disclosed in JP 4199826 B, there is only disclosure of detection coils, and with a simple body for each phase of the detection coils it is possible to reduce the influence of noise, but there is a problem, from FIG. 5a, that it is not possible to negate induction noise which is passed from the excitation coils and influences all detection coils. Accordingly, it is necessary to a devise a technology that can appropriately combine the excitation coils and the detection coils in order to increase angle detection accuracy.

SUMMARY

With the present invention, there is provided a stator and a resolver that can negate inductive noise caused by an external magnetic field, that is passed to excitation coils and affects detection coils, by effectively matching the number of windings of each coil and making wires that connect between each of the excitation coils and the detection coils run in the same direction, and that can increase angle detection accuracy.

A stator of present invention has a stator core with a plurality of magnetic pole teeth arranged annularly, and a plurality of coils formed by respectively winding electrical wires around the plurality of magnetic pole teeth, wherein a coil group for a single phase is formed by serially connecting a plurality of coils so that resulting magnetic flux distribution is a sine wave distribution, the coil group for a single phase is constituted by a plurality of coil sets, formed from two coils that are wound around two adjacent magnetic pole teeth, connected in series, each coil set has coils of the two magnetic pole teeth constituting the coil set wound in opposite directions to each other looking from the inside of the stator, and an electrical wire extending from an end winding of each coil is turned back so as to run in a direction opposite to an electrical wire connecting to a start winding of that coil, and is connected to either a start winding of the next coil or a connection terminal.

A resolver of another aspect of the present invention is provided with a rotor formed from a magnetic body fixed on a rotating shaft and having unevenness formed on an outer periphery, and a stator, having a stator core with a plurality of magnetic pole teeth arranged annularly around the rotor, and a plurality of coils formed by respectively winding electrical wire around the plurality of magnetic pole teeth, the resolver detecting a rotational position of the rotating shaft by detecting variations in reluctance between the rotor and the stator, wherein a coil group for a single phase is constituted by a plurality of coil sets, formed from two coils that are wound around two adjacent magnetic pole teeth, connected in series, each coil set has coils of the two magnetic pole teeth constituting the coil set wound in opposite directions to each other looking from the inside of the stator, two connection terminals connected to both ends of the coil group for a single phase are arranged adjacently, and an electrical wire extending from an end winding of each coil is turned back so as to run in a direction opposite to an electrical wire connecting to a start winding of that coil, and is connected to either a start winding of the next coil or a connection terminal.

In this case, it is preferable for the stator to have an excitation coil group for one phase and detection coil groups for two phases, and for six connection terminals, connected to both ends of each of the excitation coil group and the detection coil groups, to all be arranged adjacent to each other. According to the present invention, the number of windings of each coil is substantially matched and it is possible to make electrical wires that connect between each of the coils of the excitation coils and detection coils run in the same direction. As a result it is possible to negate inductive noise caused by an external magnetic field, that is passed to excitation coils and affects all detection coils, and to increase angle detection accuracy.

DETAILED DESCRIPTION

Figure 3A:
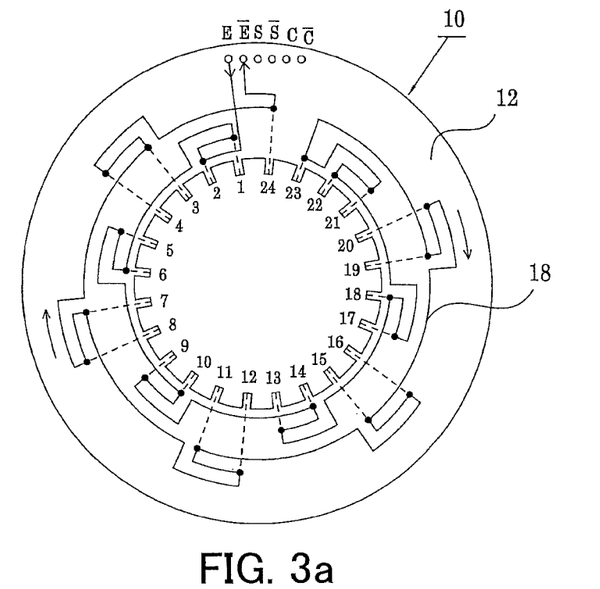
FIG. 3a is a drawing showing an arrangement pattern of an excitation coil group in an embodiment of the present invention.
Figure 3B:
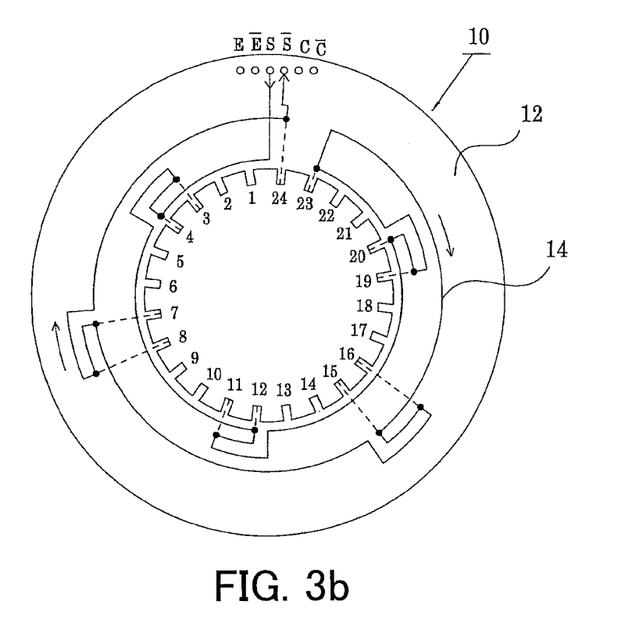
FIG. 3b is a drawing showing an arrangement pattern of a detection coil group (SIN phase) in an embodiment of the present invention.
Figure 3C:
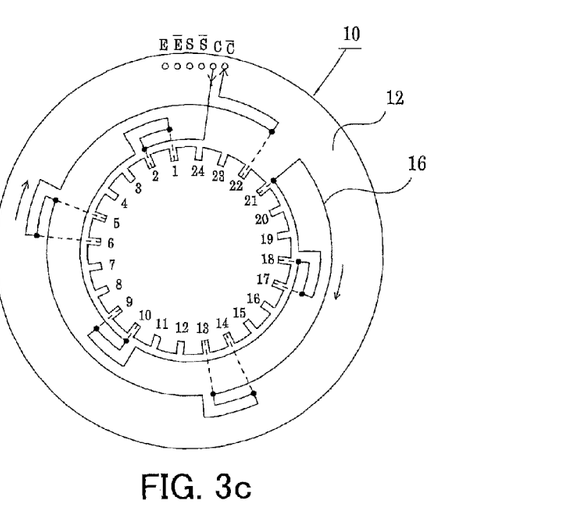
FIG. 3c is a drawing showing an arrangement pattern of a detection coil group (COS phase) in an embodiment of the present invention.

An embodiment of the present invention will be described in the following with reference to the drawings. FIG. 3a-FIG. 3c are schematic drawings of coils wound on a stator 10, in a reluctance type resolver which is an embodiment of the present invention. FIG. 3a shows an excitation coil group 18, FIG. 3b shows a detection coil group 14 (SIN phase), and FIG. 3c shows a detection coil group 16 (COS phase). As shown in FIG. 3a-FIG. 3c, a stator core 12 of the resolver has 24 tooth sections individually provided on an internal bore, and each tooth section has an electrical wire wound around it to form a coil. The stator 10 of this embodiment is provided with an excitation coil group 18 of one phase, and the detection coil groups 14 of two phases (SIN phase and COS phase). The coil groups 14, 16, and 18 of each phase are constructed by serially connecting a plurality of individual coils. Black dots shown in FIG. 3 represent tooth sections where each electrical wire is wound.

Figure 4A:
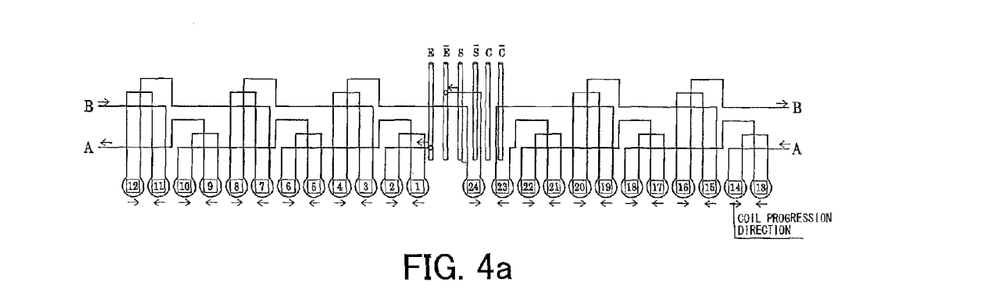
FIG. 4a is a development view schematically showing the arrangement pattern shown in FIG. 3a, looking from the internal bore of the stator.

FIG. 4a is a development view schematically showing an arrangement pattern for the excitation coil group 18 shown in FIG. 3a, looking from the internal bore of the stator 10. The arrangement of the excitation coil group 18 will be described using FIG. 4a.

As shown in FIG. 3a and FIG. 4a, the excitation coil group 18 is wound so that magnetic flux direction is opposite in adjacent tooth sections. Also, the excitation coil group 18 is formed by connecting a plurality of coil sets, formed from two coils that are wound around two adjacent magnetic pole teeth, in series. In this embodiment, the excitation coil group 18 is made up of twelve sets, namely tooth section Nos. (1, 2), (3, 4), (5, 6), (7, 8), (9, 10), (11, 12), (13, 14), (15, 16), (17, 18), (19, 20), (21, 22), and (23, 24).

The excitation coil group 18 has electrical wire that runs from an output terminal E in an anticlockwise direction on the circumference of the stator 10, is wound around tooth section No. 2, and once winding on the tooth section No. 2 is finished is turned back on the circumference of the stator 10 in the opposite direction (clockwise direction) and is wound on the next tooth section (No. 1). Then, once winding of electrical wire around tooth section No. 1 is completed, the electrical wire is turned back again in the opposite direction (anticlockwise direction) on the circumference of the stator 10, and runs to the next tooth section (No. 6). Then, after that, using the same procedure, winding is repeated in the order of tooth section Nos. 5, 10, 9, 14, 13, 18, 17, 22, 21, 23, 19, 20, 15, 16, 11, 12, 7, 8, 3, 4, 24, and finally the electrical wire is connected to the output terminal $\overline{E}$. That is, for all tooth sections, an electrical wire that extends from an end winding of a coil is turned back so as to run in a direction opposite to an electrical wire connecting to a start winding of that coil, and the electrical wire is run to be connected to either a start winding of the next coil or a connection terminal.

Also, with respect to the winding direction of the coils, winding direction is respectively reversed for two adjacent magnetic pole teeth, looking from the inside of the stator 10, so tooth section Nos. [2n(N=1, ..., 12)] are wound in an anti-clockwise direction looking from the inside of the stator 10, while tooth section Nos. [2n−1(n=1, . . . , 12)] are wound in a clockwise direction looking from the inside of the stator 10

Next, the detection coil groups 14 and 16 will be described using FIG. 4b and FIG. 4c. There are two detection coil groups, namely a SIN phase coil group 14, and a COS phase coil group 16. Each of the detection coil groups 14, 16 is formed by connecting a plurality of coil sets, formed from two coils that are wound around two adjacent magnetic pole teeth, in series. In this embodiment, the SIN phase is constituted by a group of tooth section Nos. (3, 4), (7, 8), (11, 12), (15, 16), (19, 20), and (23, 24). Also, the group of tooth section Nos. (3, 4), (11, 12) and (19, 20) and the group of tooth section Nos. (7, 8), (15, 16) and (23, 24) have a structure with phases offset by 180°.

Electrical wire constituting the SIN phase extends from an output terminal S in an anticlockwise direction on the circumference of the stator 10, is wound on the tooth section No. 4, and is then turned back in the opposite direction (clockwise direction) on the circumference of the stator 10, towards the tooth section No. 3. Then, once winding of electrical wire around tooth section No. 3 is completed, the electrical wire is turned back again in the opposite direction (anti-clockwise direction) on the circumference of the stator 10. Subsequently, using the same procedure electrical wire is wound in order around tooth section Nos. 12, 11, 20, 19, 23, 15, 16, 7, 8 and 24, and finally connected to output terminal S̄. That is, for the detection coil group 14 of the SIN phase also, an electrical wire that extends from an end winding of a coil is turned back so as to run in a direction opposite to an electrical wire connecting to a start winding of that coil, and the electrical wire is run to be connected to either a start winding of the next coil or a connection terminal.

Also, the winding directions of coils constituting the SIN phase are respectively reversed for two adjacent magnetic pole teeth, looking from the inside off the stator 10. Specifically, tooth section Nos. 3, 8, 11, 16, 19, and 24 are wound in an anticlockwise direction, looking from the inside of the stator 10, while tooth section Nos. 4, 7, 12, 15, 20 and 23 are wound in a clockwise direction looking from the inside of the stator 10.

Next the detection coil group 16 of the COS phase will be described. The COS phase detection coil group 16 is made up of a group of tooth section Nos. (1, 2), (5, 6), (9, 10), (13, 14), (17, 18), and (21, 22). Also, the group of tooth section Nos. (1, 2), (9, 10) and (17, 18) and the group of tooth section Nos. (5, 6), (13, 14) and (21, 22) have a structure with phases offset by 180°.

Electrical wire constituting the COS phase extends from an output terminal C in an anticlockwise direction on the circumference of the stator 10, is wound on the tooth section No. 2, and is then turned back in the opposite direction (clockwise direction) on the circumference of the stator 10, towards the tooth section No. 1. Then, once winding of electrical wire around tooth section No. 1 is completed, the electrical wire is turned back again in the opposite direction (anti-clockwise direction) on the circumference of the stator 10. Subsequently, using the same procedure electrical wire is wound in order around tooth section Nos. 10, 9, 18, 17, 21, 13, 14, 5, 6, and 22, and finally connected to output terminal C̄. That is, for the detection coil group 16 of the COS phase also, an electrical wire that extends from an end winding of a coil is turned back so as to run in a direction opposite to an electrical wire connecting to a start winding of that coil, and the electrical wire is run to be connected to either a start winding of the next coil or a connection terminal.

The winding directions of coils constituting the COS phase are respectively reversed for two adjacent magnetic pole teeth, looking from the inside off the stator 10. Accordingly, tooth section Nos. 1, 6, 9, 14, 17, and 22 are wound in a clockwise direction looking from the inside of the stator 10, while tooth section Nos. 2, 5, 10, 13, 18, and 21 are wound in an anticlockwise direction looking from the inside of the stator 10.

Here, with the arrangement pattern for the excitation coil group 18 as shown in FIG. 4a, the excitation coil group 18 is connected from the output terminal E, wound in the order of tooth section Nos. 2, 1, 6, 5, 10, 9, 14, 13, 18, 17, 22, 21, 23, 19, 20, 15, 16, 11, 12, 7, 8, 3, 4, and 24, and connected to the output terminal Ē. Then, electrical wires connecting between coils are reversed with respect to each other, and are adjacent, which means that it is possible to negate any influence due to an external magnetic field, and it is possible to increase angle detection accuracy.

Figure 4B:
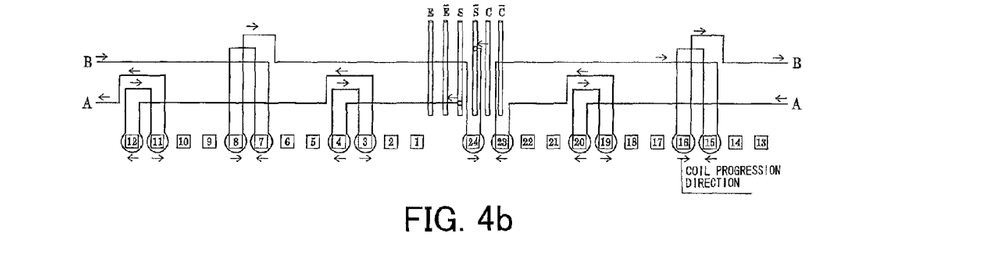
FIG. 4b is a development view schematically showing the arrangement pattern shown in FIG. 3b, looking from the internal bore of the stator.

Also, with the arrangement pattern for the detection coil group of the SIN phase as shown in FIG. 4b, the SIN phase is connected from the output terminal S, wound in the order of tooth section Nos. 4, 3, 12, 11, 20, 19, 23, 15, 16, 7, 8 and 24, and connected to the output terminal S̄. Then, electrical wires connecting between coils are reversed with respect to each other, and are adjacent, which means that it is possible to negate any influence due to an external magnetic field, and it is possible to increase angle detection accuracy.

Figure 4C:
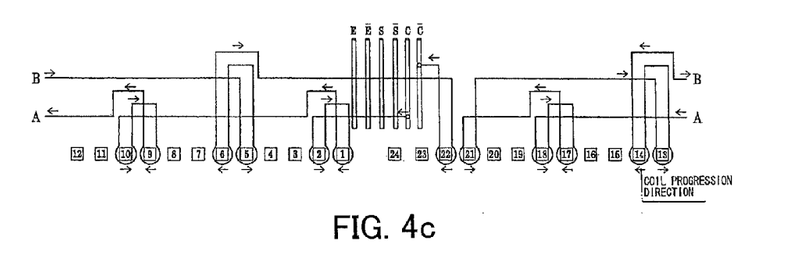
FIG. 4c is a development view schematically showing the arrangement pattern shown in FIG. 3c, looking from the internal bore of the stator.

Similarly to the SIN phase, with the arrangement pattern for the detection coil group 16 of the COS phase as shown in FIG. 4c, the COS phase is connected from the output terminal C, wound in the order of tooth section Nos. 2, 1, 10, 9, 18, 17, 21, 13, 14, 5, 6, and 22, and connected to the output terminal C̄. Electrical wires connecting between coils are then reversed with respect to each other, and are adjacent, which means that it is possible to negate any influence due to an external magnetic field, and it is possible to increase angle detection accuracy.

Also, after winding a tooth section, since an electrical wire is repeatedly turned back on the circumference of the stator 10, the way in which input side coils and output side coils of all coils constituting the excitation and detection coil groups 14, 16, 18 overlap becomes the same. As a result, since the number of windings is practically matched for each coil it is possible to increase angle detection accuracy.

Figure 5B:
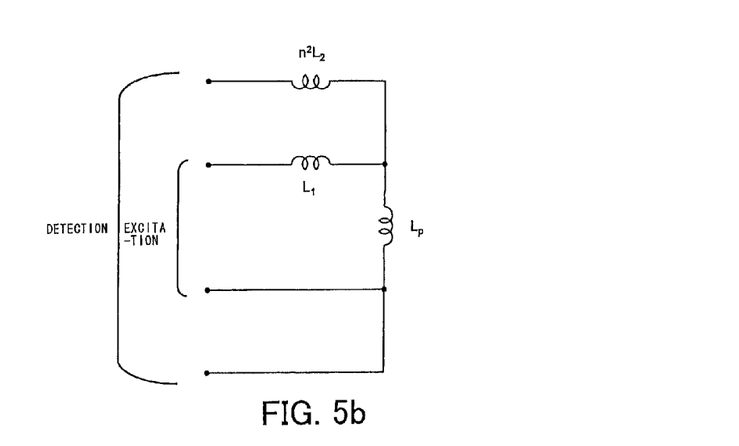
FIG. 5b is a drawing showing equivalent circuit of a resolver of this embodiment.

Also, six connection terminals are arranged all adjacent, and directions of electrical wires connecting respective coils of the excitation and detection coil groups 14, 16, and 18 are the same, and respective coils are adjacent. A schematic diagram for an equivalent circuit of a resolver of this embodiment therefore becomes as shown in FIG. 5b. In this case, it is possible to negate inductive noise caused by an external magnetic field that is passed to excitation coils and influences all detection coils, and it is possible to increase angle detection accuracy.

Also in the case where, for the winding directions of magnetic pole teeth of the excitation coils, tooth section Nos. [2n(n=1, . . . 12)] are wound in a clockwise direction looking from the inside of the stator 10, and tooth section Nos. [2n−1(n=1, . . . , 12)] are wound in an anticlockwise direction looking from the inside of the stator 10, the same effects as for the above-described embodiment can be obtained. Also for the detection coils, similarly, it is also possible, with respect to the winding directions of magnetic pole teeth of the SIN phase coils, to wind tooth section Nos. 3, 8, 11, 16, 19, and 24 in a clockwise direction looking from the inside of the stator 10, and to wind tooth section Nos. 4, 7, 12, 15, 20, and 23 in an anticlockwise direction looking from the inside of the stator 10. Similarly, with respect to the winding direction of magnetic pole teeth of the COS phase coils, it is also possible to wind tooth section Nos. 1, 6, 9, 14, 17, and 22 in an anticlockwise direction looking from the inside of the stator 10, and to wind tooth section Nos. 2, 5, 10, 13, 18, and 21 in a clockwise direction looking from the inside of the stator 10. Also, with this embodiment, a case having twenty-four tooth sections has been exemplified, but obviously the embodiment can also be applied to a resolver a having a different number of teeth.

What is claimed is:

1. A resolver, comprising a rotor formed from a magnetic body fixed on a rotating shaft and having concave and convex sections formed on an outer periphery, and a stator, having a stator core with a plurality of magnetic pole teeth arranged annularly around the rotor, and a plurality of coils formed by respectively winding electrical wire around the plurality of magnetic pole teeth, the resolver detecting a rotational position of the rotating shaft by detecting variations in reluctance between the rotor and the stator, comprising:
   a coil group for a single phase comprising a plurality of coil sets, each coil set formed from two coils that are wound around two adjacent magnetic pole teeth, electrically connected in series,
   each coil set includes the coils of the two adjacent magnetic pole teeth wound in opposite directions to each other when observed from the inside of the stator, and
   two connection terminals electrically connected to each end of the coil group for a single phase arranged adjacently,
   wherein an electrical wire connecting to an end winding of each coil is turned back along the circumference of the stator so as to run in a direction along the circumference of the stator opposite to an electrical wire connecting to a start winding of that coil, and
   wherein the electrical wire connecting to an end winding of that coil is connected to either a start winding of a next coil or a connection terminal.

2. The resolver of claim 1, wherein the coil group for a single phase is an excitation coil group of one phase, and further comprising:
   a second and third coil group for a single phase, wherein the second and third coil group for a single phase are detection coil groups of two phases, and
   six connection terminals, connected to both ends of each of the excitation coil group and the two detection coil groups, all arranged adjacent to each other.

* * * * *

UNITED STATES PATENT AND TRADEMARK OFFICE
CERTIFICATE OF CORRECTION

PATENT NO. : 9,136,737 B2
APPLICATION NO. : 13/462369
DATED : September 15, 2015
INVENTOR(S) : Yura et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 524 days.

Signed and Sealed this
Twenty-third Day of August, 2016

Michelle K. Lee
*Director of the United States Patent and Trademark Office*